(No Model.)

J. W. WALLACE.
STERILIZER.

No. 578,376.  Patented Mar. 9, 1897.

WITNESSES:
H. E. Spencer
Milton M. Goldsmith

INVENTOR
John W. Wallace
BY H. A. West
ATTORNEY

UNITED STATES PATENT OFFICE.

JOHN W. WALLACE, OF BROOKLYN, NEW YORK.

STERILIZER.

SPECIFICATION forming part of Letters Patent No. 578,376, dated March 9, 1897.

Application filed May 28, 1896. Serial No. 593,413. (No model.)

*To all whom it may concern:*

Be it known that I, JOHN W. WALLACE, a citizen of the United States, and a resident of Brooklyn, in the county of Kings and State of New York, have invented certain new and useful Improvements in Sterilizers, of which the following is a specification.

My invention relates to a sterilizing apparatus designed for surgeons' use and for use in hospitals, for sterilizing by heat and live steam the bandages, towels, instruments, &c., used in the treatment of wounds, &c., and during the performance of surgical operations; and my invention consists in a sterilizer having such construction as to form a main body or sterilizing-chamber and a water-supply tank which communicates at top and bottom with the main chamber, the points of both communications terminating a short distance above the bottom of the main chamber.

Figure 1:
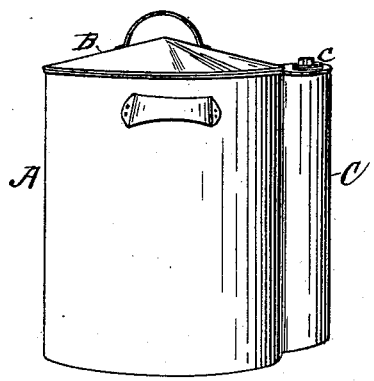
Figure 2:
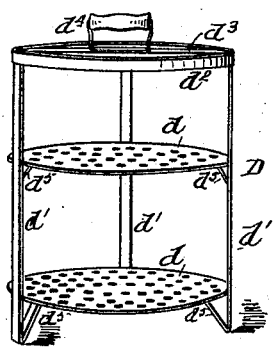
Figure 3:
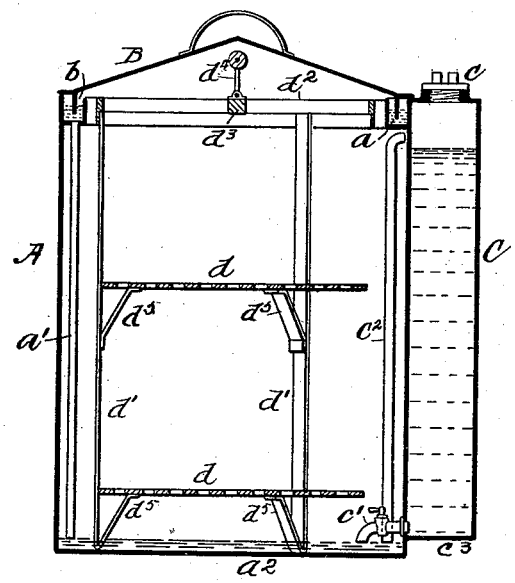

In the accompanying drawings, to which reference is made, and which form a part of this specification, Figure 1 is a side view of my new and improved sterilizer as it appears when closed and ready for use. Fig. 2 is a perspective view of the supporting trays and frame therefor removed from the body of the sterilizer, and Fig. 3 is a sectional elevation of the sterilizer complete.

A represents the main body of the sterilizer, made of tin, sheet-copper, or other suitable material, and adapted to be externally heated. The top of the said body A is formed with a sealing-channel $a$ to receive a small quantity of water, into which a flange $b$ on the cover B is adapted to dip for preventing the escape of steam. A drip-pipe $a'$ leads from above the bottom of the channel $a$ down to a point near the bottom of the main body A, so that the said drip-pipe $a'$ will retain the water in the channel $a$ to a uniform level and afford escape for the surplus water in the channel down into the body A.

C represents a tank or reservoir for cold water. This tank is made as a part of the main body A or attached thereto. It is closed at the top by a plug $c$ and is connected to the body A at the bottom by a faucet or other outlet $c'$, adapted to be closed, and at the top by a vent pipe or tube $c^2$, which terminates at its lower end a short distance above the bottom of the main body A. The faucet $c'$ enters the tank or reservoir C at the bottom $c^3$ thereof, which is raised above the bottom $a^2$ of the main body A, as shown, so that the entire contents of the tank may pass out at the faucet. The end of the faucet $c'$, which enters the main body A, terminates a short distance above the bottom $a^2$ and is on a level or thereabout with the lower end of the tube $c^2$. In this manner a shallow depth or film of water is automatically maintained in the bottom of the main chamber A, as illustrated in Fig. 3, so that steam may be generated in the sterilizing-chamber in a very short space of time, and as rapidly as the water is converted into steam the vacuum at the top of the tank C will be destroyed by steam or steam and air passing up the tube $c^2$, and thus permit the water to flow through the faucet $c'$ until the same and pipe $c^2$ are sealed by the inflow into the main body A.

The tray D is by preference formed of one or more perforated supports $d$ $d$, attached to legs $d'$, which are united at their upper ends to a frame $d^2$, which frame is provided with a cross-piece $d^3$, to which a handle $d^4$ is attached by which the entire tray and its contents may be conveniently placed in and removed from the sterilizing-chamber. The perforated supports $d$ are supported on braces $d^5$ $d^5$, attached to the legs $d$, as shown clearly in Fig. 3.

The cover B is conical, so that the water of condensation will flow down its inner surface into the channel $a$ and form the seal for the cover to prevent escape of steam. Owing to the employment of the tube $a'$, the channel $a$ can never overflow, for during the interval of each intermittent flow of water from the faucet $c'$ water is discharged from the channel $a$ in quantities corresponding to the depth of water therein, and hence no overflow can take place, which, if permitted, would be likely to reach the articles on the tray, which it is desired to subject to the action of live steam only.

Having thus described my invention, what I claim as new, and desire to secure by Letters Patent, is—

As a new article of manufacture, a sterilizer comprising a main body, which constitutes a sterilizing-chamber, and a closed tank or reservoir for water connected at the bottom with the said chamber by a faucet whose outlet is slightly above the bottom of the said chamber, and connected at the top with the said chamber by a vent pipe or tube which terminates near the bottom of the said chamber; substantially as described.

JOHN W. WALLACE.

Witnesses:
  H. A. WEST,
  H. E. SPENCER.